(12) United States Patent
Olsson

(10) Patent No.: US 8,645,247 B2  
(45) Date of Patent: Feb. 4, 2014

(54) SYSTEMS FOR STRUCTURED INVESTMENT SEEDING

(75) Inventor: David E. Olsson, London (GB)

(73) Assignee: Bank of America Corporation, Charlotte, NC (US)

(*) Notice: Subject to any disclaimer, the term of this patent is extended or adjusted under 35 U.S.C. 154(b) by 49 days.

(21) Appl. No.: 13/196,510

(22) Filed: Aug. 2, 2011

(65) Prior Publication Data

US 2012/0179626 A1 Jul. 12, 2012

Related U.S. Application Data

(60) Provisional application No. 61/430,527, filed on Jan. 6, 2011.

(51) Int. Cl.
*G06Q 40/00* (2012.01)

(52) U.S. Cl.
USPC ............................................. 705/35; 705/36

(58) Field of Classification Search
CPC ...................................................... G06Q 40/00
USPC ........................................................... 705/36
See application file for complete search history.

(56) References Cited

U.S. PATENT DOCUMENTS

| 7,865,426 B2* | 1/2011 | Volpert | 705/37 |
| 2007/0162365 A1* | 7/2007 | Weinreb | 705/35 |
| 2009/0030853 A1* | 1/2009 | De La Motte | 705/36 R |

* cited by examiner

*Primary Examiner* — Bruce I Ebersman
*Assistant Examiner* — John Anderson
(74) *Attorney, Agent, or Firm* — Banner & Witcoff, Ltd.; Michael A. Springs

(57) ABSTRACT

The disclosure provides an investment structure and corresponding arrangement which involves methods and systems whereby the asset manager directly or indirectly makes a seed investment in the new fund and hedges its risk, while obtaining financing on its investment. Additionally, in another embodiment, the financial institution or asset manager may actually make an investment into the fund and hedge itself by trading with the fund. The financial institution would require little collateral as the methods and systems of the disclosure are designed to recognize offsetting positions and early detect any hedging mismatches.

12 Claims, 3 Drawing Sheets

SYSTEMS FOR STRUCTURED INVESTMENT SEEDING

CROSS REFERENCE TO RELATED APPLICATIONS

This Application claims priority to U.S. Provisional Application Ser. No. 61/430,527, filed Jan. 6, 2011, herein incorporated by reference.

TECHNICAL FIELD

Aspects of the disclosure relate to systems and methods, including computer programs, for providing structured investment seeding solutions.

BACKGROUND

Prior to the economic downturn of 2008 and the global credit crisis, investors allocated capital to investment funds, such as hedge funds, based on performance and the pedigree of the funds' managers. However, since the crash investors have demanded other characteristics such as liquidity and transparency. These demands continue to increase and asset managers are responding to investors' concerns, especially in view of unprecedented redemptions by investors. For example, some managers are making hedge funds more transparent or are agreeing to managed accounts. Others are looking to establish more liquid and transparent funds such as those governed by the United States' Investment Company Act of 1940, as amended (funds governed thereby being "40 Act Funds"), the European Union's Undertakings for Collective Investment in Transferable Securities (such funds governed thereby being "UCITS") or comparable rules, regulations, and/or directives in other jurisdictions. "UCITS" stands for Undertakings for Collective Investment in Transferable Securities, which are a set of European Union (EU) directives that allow collective investment schemes to operate freely throughout the EU. Under the current regime, UCITS funds can be marketed within all EU countries, provided that the fund and fund managers are registered within the domestic country.

All asset managers may face the problem that they may not have the requisite capital to establish or invest directly in 40 Act Funds, UCITS or similar funds and/or may be unable to invest directly in such UCITS or similar funds. Critical mass of investors at inception is crucial to marketing a fund in any jurisdiction at the moment.

BRIEF SUMMARY

The following presents a simplified summary of the disclosure in order to provide a basic understanding of some aspects. It is not intended to identify key or critical elements of the disclosure or to delineate the scope of the disclosure. The following summary merely presents some concepts of the disclosure in a simplified form as a prelude to the more detailed description provided below.

Aspects described herein address a need for an arrangement to address the above described problems. In accordance with aspects of the disclosure, an apparatus with at least one processor; and at least one memory storing computer executable instructions is disclosed. The executable instruction, when executed, cause the apparatus at least to: provide structured finance products under one or more potential seeding structures, monitor the transactions and/or investments under the one or more potential seeding structures, generate reports for the one or more potential seeding structures, and track and analyze trading risks associated with the one or more potential seeding structures. Additionally, the one or more potential seeding structures may include a seeding investment agreement to establish a mutual investment fund, a prepayment amount into the mutual investment fund, and a return on the seeding investment agreement based on a cash flow from the mutual investment fund.

In another embodiment in accordance with aspects of the disclosure, a method for executing a structured seeding investment is disclosed. The method may include: making, by a processor, a seed investment in a fund, wherein the seed investment has a risk; hedging, by a processor, the risk of the seed investment by investing in the fund and shorting an index that the fund tracks; and receiving a prepayment amount against the investing in the fund and the shorting of the index that the fund tracks.

In another embodiment in accordance with aspects of the disclosure, an apparatus with at least one processor; and at least one memory storing computer executable instructions is disclosed. The executable instruction, when executed, cause the apparatus at least to: provide structured finance products under one or more potential seeding structures, monitor the transactions and/or investments under the one or more potential seeding structures, generate reports for the one or more potential seeding structures, and track and analyze trading risks associated with the one or more potential seeding structures. Additionally, the one or more potential seeding structures may include a seeding investment agreement into a mutual investment fund, a purchase of a percentage of equity in the mutual investment fund via an offshore entity, and a trade execution of the mutual investment fund.

One skilled in the art will appreciate that one or more of the aforementioned systems, methods, and features may be embodied as computer-executable instructions stored on a computer-readable medium and/or memory, where execution of the computer-executable instructions by a processor causes a computer or other apparatus to perform the operations described herein.

BRIEF DESCRIPTION OF THE DRAWINGS

The present disclosure is illustrated by way of example and not limited in the accompanying figures in which like reference numerals indicate similar elements and in which.

DETAILED DESCRIPTION

In the following description of the various embodiments, reference is made to the accompanying drawings, which form a part hereof, and in which is shown by way of illustration various embodiments in which the disclosure may be practiced. It is to be understood that other embodiments may be utilized and structural and functional modifications may be made without departing from the scope and spirit of the present disclosure.

Since the 2008 market downturn, market has demanded that asset managers launch liquid, regulated, transparent funds to meet investor demand. Asset managers may have a difficult time attracting third-party money to launch funds, and therefore must provide funding for start-up funds themselves. Where asset managers may not have the requisite capital, or may otherwise be unable, to establish or invest in 40 Act Funds, UCITS or similar funds directly, the arrangements according to the disclosure allow managers to utilize the disclosure to achieve such goals.

The disclosure provides an investment structure and corresponding arrangement which involves methods and systems whereby the asset manager directly or indirectly makes a seed investment in the new fund and hedges its risk, while obtaining financing on its investment. For example, the asset manager may invest in the fund and short the constituents of the fund or short an index that the fund tracks. A service or structured products provider or financial institution may provide a prepayment amount against the combined offsetting positions, requiring minimum upfront collateral or margin from the asset manager (e.g., 5-20% of the amount of the prepayment, typically. Other percentages may be utilized for the minimum upfront collateral without departing from this disclosure.). In another iteration, the service or structured products provider or financial institution may actually make an investment into the fund and hedge itself by trading with the fund. In addition to the benefit of a minimum capital required to seed the new fund, the asset manager is not exposed to the fund's performance and thus preserves its capital. The service or structured products provider or financial institution may require little collateral as the methods and systems of the disclosure are designed to recognize offsetting positions and early detect any hedging mismatches.

Figure 1:
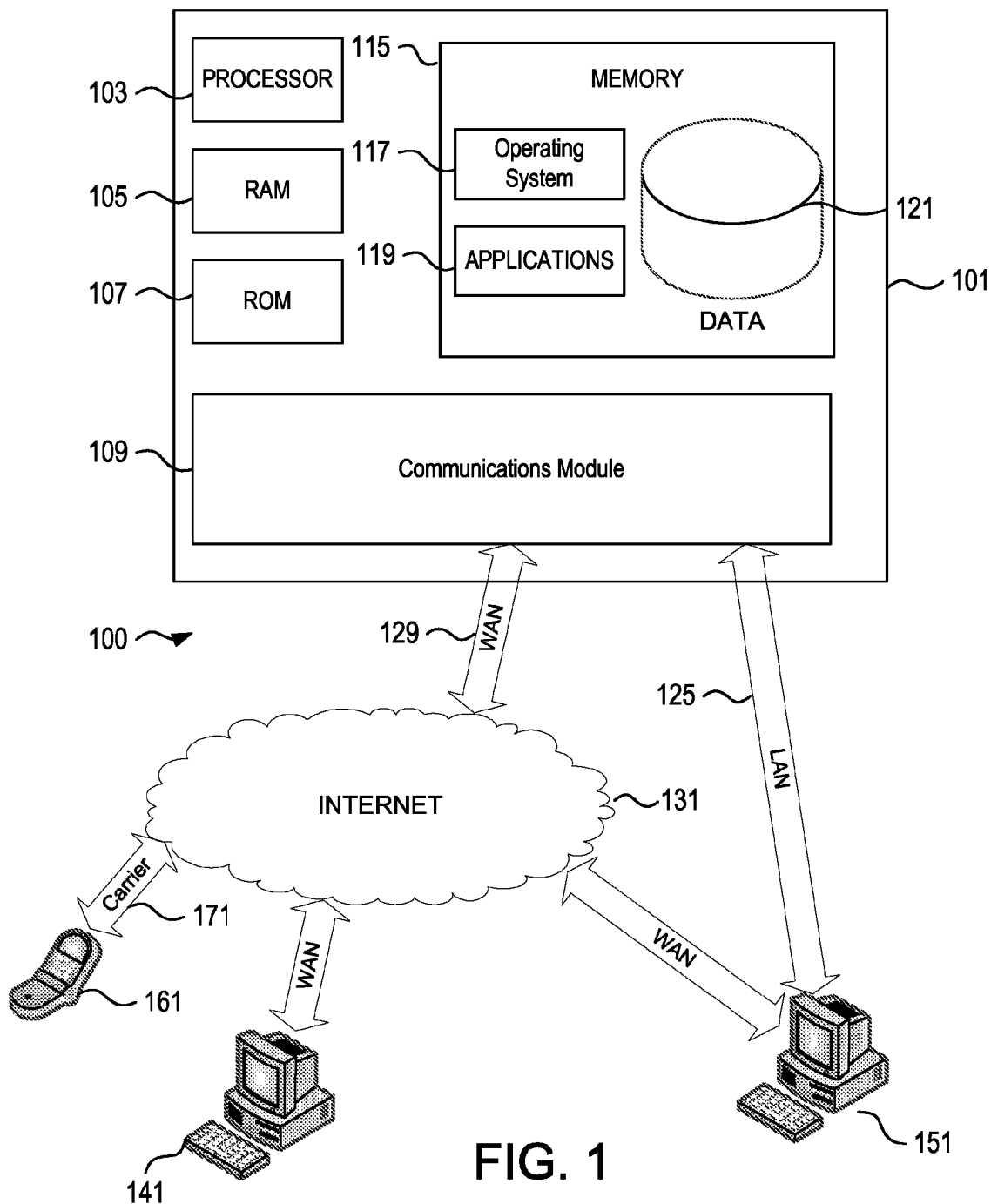
FIG. 1 shows an illustrative operating environment in which various aspects of the disclosures may be implemented in accordance with example embodiments.

FIG. 1 illustrates an example of a suitable computing system environment 100 that may be used according to one or more illustrative embodiments. The computing system environment 100 is only one example of a suitable computing environment and is not intended to suggest any limitation as to the scope of use or functionality contained in the disclosure. The computing system environment 100 should not be interpreted as having any dependency or requirement relating to any one or combination of components shown in the illustrative computing system environment 100.

The disclosure is operational with numerous other general purpose or special purpose computing system environments or configurations. Examples of well known computing systems, environments, and/or configurations that may be suitable for use with the disclosed embodiments include, but are not limited to, personal computers (PCs), server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

With reference to FIG. 1, the computing system environment 100 may include a computing device 101 wherein the processes discussed herein may be implemented. The computing device 101 may have a processor 103 for controlling overall operation of the computing device 101 and its associated components, including random-access memory (RAM) 105, read-only memory (ROM) 107, communications module 109, and memory 115. Computing device 101 typically includes a variety of computer readable media. Computer readable media may be any available media that may be accessed by computing device 101 and include both volatile and nonvolatile media, removable and non-removable media. By way of example, and not limitation, computer readable media may comprise a combination of computer storage media and communication media.

Computer storage media include volatile and nonvolatile, removable and non-removable media implemented in any method or technology for storage of information such as computer readable instructions, data structures, program modules or other data. Computer storage media include, but is not limited to, random access memory (RAM), read only memory (ROM), electronically erasable programmable read only memory (EEPROM), flash memory or other memory technology, CD-ROM, digital versatile disks (DVD) or other optical disk storage, magnetic cassettes, magnetic tape, magnetic disk storage or other magnetic storage devices, or any other medium that can be used to store the desired information and that can be accessed by computing device 101.

Communication media typically embodies computer readable instructions, data structures, program modules or other data in a modulated data signal such as a carrier wave or other transport mechanism and includes any information delivery media. Modulated data signal includes a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media.

Computing system environment 100 may also include optical scanners (not shown). Exemplary usages include scanning and converting paper documents, e.g., correspondence, receipts, etc. to digital files.

Although not shown, RAM 105 may include one or more are applications representing the application data stored in RAM 105 while the computing device is on and corresponding software applications (e.g., software tasks), are running on the computing device 101.

Communications module 109 may include a microphone, keypad, touch screen, and/or stylus through which a user of computing device 101 may provide input, and may also include one or more of a speaker for providing audio output and a video display device for providing textual, audiovisual and/or graphical output.

Software may be stored within memory 115 and/or storage to provide instructions to processor 103 for enabling computing device 101 to perform various functions. For example, memory 115 may store software used by the computing device 101, such as an operating system 117, application programs 119, and an associated database 121. Also, some or all of the computer executable instructions for computing device 101 may be embodied in hardware or firmware.

Computing device 101 may operate in a networked environment supporting connections to one or more remote computing devices, such as computing devices 141, 151, and 161. The computing devices 141, 151, and 161 may be personal computing devices or servers that include many or all of the elements described above relative to the computing device 101. Computing device 161 may be a mobile device communicating over wireless carrier channel 171.

The network connections depicted in FIG. 1 include a local area network (LAN) 125 and a wide area network (WAN) 129, but may also include other networks. When used in a LAN networking environment, computing device 101 may be connected to the LAN 825 through a network interface or adapter in the communications module 109. When used in a WAN networking environment, the computing device 101 may include a modem in the communications module 109 or other means for establishing communications over the WAN 129, such as the Internet 131 or other type of computer network. It will be appreciated that the network connections shown are illustrative and other means of establishing a communications link between the computing devices may be used. Various well-known protocols such as TCP/IP, Ethernet, FTP, HTTP and the like may be used, and the system can be operated in a client-server configuration to permit a user to retrieve web pages from a web-based server. Any of various conventional web browsers can be used to display and manipulate data on web pages.

Additionally, one or more application programs 119 used by the computing device 101, according to an illustrative embodiment, may include computer executable instructions for invoking user functionality related to communication including, for example, email, short message service (SMS), and voice input and speech recognition applications.

Embodiments of the disclosure may include forms of computer-readable media. Computer-readable media include any available media that can be accessed by a computing device 101. Computer-readable media may comprise storage media and communication media and in some examples may be non-transitory. Storage media include volatile and nonvolatile, removable and non-removable media implemented in any method or technology for storage of information such as computer-readable instructions, object code, data structures, program modules, or other data. Communication media include any information delivery media and typically embody data in a modulated data signal such as a carrier wave or other transport mechanism.

Although not required, various aspects described herein may be embodied as a method, a data processing system, or as a computer-readable medium storing computer-executable instructions. For example, a computer-readable medium storing instructions to cause a processor to perform steps of a method in accordance with aspects of the disclosed embodiments is contemplated. For example, aspects of the method steps disclosed herein may be executed on a processor on a computing device 101. Such a processor may execute computer-executable instructions stored on a computer-readable medium.

According to the disclosure, an investment structure and corresponding arrangement which involves systems and methods, including computer programs, that enable asset managers to benefit, either directly or indirectly, from UCITS or similar investments, and in particular to afford benefits provided under the UCITS or similar regime, by providing structured finance products under several potential seeding structures such as the ones described above and in more detail below, that monitor the transactions and/or investments under such arrangements, that generate corresponding reports, and that allow for hedging against risks associated with such arrangements. In addition, computerized spreadsheets and other internal programs may be used to monitor trading risk.

The arrangements according to the disclosure are characterized by transaction structures that address concerns facing investors such as liquidity, credit risk and transparency. In addition, the corresponding products enable investors and managers to take advantage of: 1) the UCITS framework, which is accepted by a broad range of investors, including many pension funds and insurance companies; 2) transparency and risk limits characterizing UCITS funds: adhering to a set of guidelines requiring (among other things) diversification, majority investment in transferable securities, and counterparty exposure limits; 3) liquidity (which could be weekly, bi-weekly, daily, etc.) which allows for flexible allocation while easing risk management and matching liquidity terms; 4) advantageous tax treatment for European regulated vehicles in most European countries; and 5) regulated service provision and independent risk monitoring which provide comfort and a higher level of security under UCITS.

For example, two general transaction arrangements and corresponding structures/products according to the disclosure are described in the following. While the following discussion focuses on product development in the UCITS regime, the principles underlying the arrangements and structures described below are more generally applicable to several other investment vehicles. For example, similar structured products or arrangements may be offered to asset managers seeking to launch investment products in other established and emerging global regulatory markets and regimes, including collective investment strategies. Another example to which the principles of the disclosure are applicable are 40 Act Funds, or any other type of liquid fund such as comparable funds in other jurisdictions which have similar characteristics to UCITS funds. 40 Act Funds also require regular liquidity (daily), regulated service providers, and impose risk limits on the funds registered under the Investment Company Act of 1940.

Seeding Structure I. According to certain embodiments of the disclosure, a service or structured products "Provider" (e.g., a financial institution) preferably enters into a seeding investment agreement 200 or "Swap" with a "Counterparty" such as an asset manager 210 (e.g., at a hedge fund) seeking to establish a mutual investment fund 230. The mutual investment fund 230 may be a fund governed by the United States' Investment Company Act of 1940 or a fund governed by UCITS. The seeding investment agreement 200 is preferably prepaid (i.e., the provider may offer the Counterparty a "Prepayment Amount" 212 which incentivizes the asset manager 210 to establish the mutual investment fund 230). The asset manager 210 would therefore invest the Prepayment Amount 212 (as well as, if necessary, its own capital) in the established mutual investment fund 230 as a seeding investment 216. This way, the asset manager 210 can establish and invest in mutual investment funds 230 while reducing the asset manager's 210 reliance on its own capital and limiting the associated risk exposure.

The seeding investment agreement 200 may be characterized, according to certain embodiments, as a total return index agreement and its reference index may be the mutual investment fund's 230 benchmark index ("Benchmark Index") 214. The financial institution 220 may receive a return on the seeding investment agreement 200 based on any of the following three distinct cash flows, or any combinations of the same, the terms of which may vary depending on a particular seeding transaction. 1) An "Equity Amount" which may be equal to the sum of the Price Differential and the Prepayment Amount 212. The "Price Differential" (which may be a negative number) may be defined as the product of the stated "Equity Notional Amount" (i.e., Prepayment Amount 212 and, optionally, the asset manager's 210 own capital) and the ratio of the difference between the "Final Price" (i.e., the closing level of the Benchmark Index 214 at a relevant valuation date as calculated and determined by the asset manager 210 acting as the calculation agent) and the "Initial Price" (i.e., the closing level of the Benchmark Index 214 at a predetermined valuation date as calculated and determined by the calculation agent) to the Initial Price. For example, the Price Differential may be calculated in accordance with the following formula:

$$\text{Price Differential} = N \times [(P_t - P_{t-1})/P_{t-1}]$$

Wherein: N is the Equity Notional Amount
$P_t$ is the Final Price
$P_{t-1}$ is the Initial Price If the Equity Amount is a positive amount, the asset manager 210 may pay this amount to the Provider. If the Equity Amount is a negative amount, the financial institution 220 may pay this amount to the asset manager 210. 2) A "Floating Amount" which may be a predetermined percentage spread over a predetermined rate such as LIBOR or any interest rate convention selected under the International Swaps and Derivatives Association (ISDA) on the Notional Amount paid on the last business day of each calendar month of the duration of the seeding investment agreement 200 subject to certain adjustments. 3) An "Up-front Payment Amount" which may be the product of the Notional or Prepayment Amount 212 and a predetermined percentage payable to the financial institution 220 on the seeding investment agreement's 200 effective date.

Shares acquired in the mutual investment fund 230 by the asset manager 210 may be pledged to the financial institution 220 as collateral for the seeding investment agreement 200. For example, shares acquired through the Prepayment 212 alone (or, additionally, through the asset manager's 210 own contribution) may be pledged to the financial institution 220. If the value of the collateral falls below a required leverage ratio, the asset manager 210 may be asked to pledge cash, other assets, and/or the mutual investment fund 230 shares subject to specified adjustments to take into account changes in the value of the mutual investment fund 230 share pledge assets and various conditions for acceptance (and continuance) of the fund shares as eligible collateral. Alternatively, or in addition, the financial institution 220 may require the asset manager 210 to invest additional capital in the mutual investment fund 230 so that there are enough fund shares to provide adequate collateral.

In certain embodiments, the mutual investment fund 230 may execute its trades 218 through the financial institution 220 via physical trading, swap transactions, or the like. The terms of the agreement underlying such an arrangement may be selected as any multiple of weeks, months, years, etc. In certain embodiments, either the financial institution 220 or asset manager 210 may have early termination rights in connection with the seeding investment agreement 200 transaction due to breach or failure to satisfy any conditions, such as the collateral falling below a required leverage ratio, failure to comply with certain reporting requirements, material change in the net asset value of the mutual investment fund 230 relative to the Benchmark Index, etc. The rights/obligations available under early termination may vary according to the reason for termination.

The financial institution 220 or any affiliate thereof may hedge against risks associated with its position(s) in the seeding investment agreement 200 by entering into derivative or other hedging transactions such that it effectively has no market exposure to such an investment. The financial institution 220 may take the opposite direction of the Benchmark Index 214 through a number of means. For example, the financial institution 220 may borrow the underlying securities in the Benchmark Index 214 and sell them short as part of its hedging activity. It also may sell performance on the Benchmark Index 214 to another financial institution as a hedge. Ultimately, the financial institution 220 monitors the overall risk to a particular Benchmark Index 214 and decides on a case-by-case basis the quantity of the Benchmark Index 214 to hedge (if at all). Computerized spreadsheets and other internal programs are used to monitor trading risk.

Figure 2:
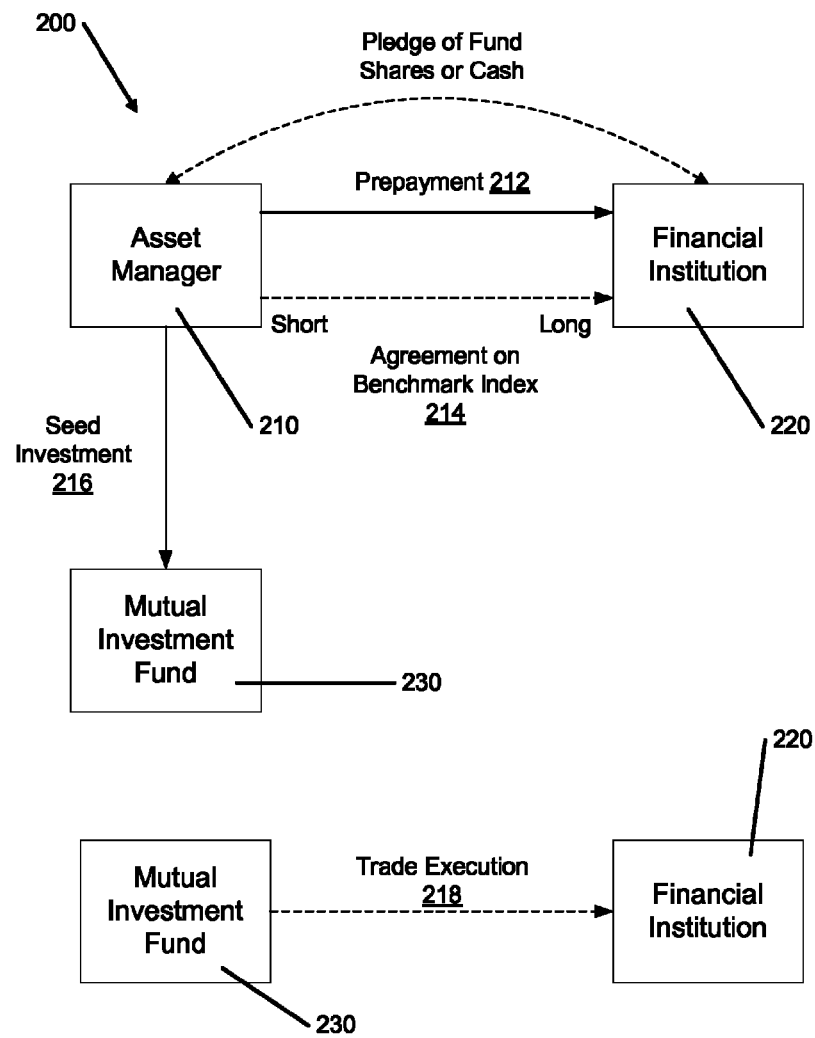
FIG. 2 is an illustrative block diagram of a structured seeding investment in accordance with the disclosure.

Such an arrangement described as Seeding Structure I 200 (i.e., a prepaid, index-based total return swap) would enable the asset manager 210 to invest directly in the underlying mutual investment fund 230. This way, the asset manager 210 (such as a hedge fund manager) can establish and invest in mutual investment funds 230 while reducing its reliance on its own capital and limiting the associated risk exposure. An illustrative transaction under this arrangement is depicted in FIG. 2 and summarized in the below description. FIG. 2 is provided for the purposes of illustration and the present disclosure is not limited to FIG. 2. Variations and modifications can be made to these, and some of the aspects discussed above are illustrated in FIG. 2 and description but other ones may not be, and vice versa.

As illustrated in FIG. 2, the following provides a summary for the transaction overview for the seeding investment agreement or Seeding Structure I 200. The seeding investment agreement 200 may appeal to a Counterparty such as an asset manager 210 that is able to directly invest in the underlying fund 230. First, the provider, such as a financial institution 220, may enter into a total return seeding investment agreement 200 with the asset manager 210. The seeding investment agreement 200 may have the following characteristics: 1) references: a mutual investment fund benchmark index, such as UCITS Fund's Benchmark Index (e.g., MSCI World); 2) term (e.g., 6-12 months, or shorter/longer term); 3) prepayment 212: at the inception, wherein the financial institution 220 may make a prepayment 212 to the asset manager 210; 4) collateral: the asset manager 210 may pledge the mutual investment fund 230 shares; and 5) early termination rights may apply (note: breakage fees may apply). Additionally, the asset manager 210 may invest the prepayment proceeds 212 (along with its own capital) into the mutual investment fund 230. Lastly the mutual investment fund 230 may execute its trades through the financial institution 220 via physical trading 218 or portfolio swap transactions.

Seeding Structure II. According to alternative embodiments of the disclosure, another seeding investment agreement 300 with a service or structured products Provider (e.g., a financial institution 320) preferably makes an equity investment into a mutual investment fund 330 subject to a seeding agreement 300 with an asset manager 310 such as at a hedge fund, seeking to take advantage of the benefits afforded by the mutual investment fund 330 regime. More specifically, the financial institution 320 may purchase a percentage of equity in the mutual investment fund 330 via an offshore entity 340. The financial institution 320 or any other arm thereof may act as the Execution Broker for the structured investment fund's 330 trading, or may act as an Introductory Broker and generate trade instructions for the final Execution Broker.

The financial institution 320 may charge the asset manager 310 fees such as a Structuring Fee (which may be an agreed upon percentage payable at the trade date) and/or Running Fees (which may be payable from the trade date to the date the seed in investment is redeemed in full). The Running Fees may be charged in weekly, monthly, yearly or in advance, in an amount equal to the product of (i) the funded amount, (ii) a base rate such as LIBOR or the prime rate plus a predetermined percentage spread, and (iii) the actual number of days elapsed in the accrual period divided by 360, 365, or any other reasonable/appropriate number.

In certain embodiments, the mutual investment fund 330 may execute its trades 316 through the financial institution 320 via physical trading, swap transactions, or the like. The terms of agreement may be selected as any multiple of weeks, months, years, etc. The investment may terminate a predetermined amount of time after the trade date or due to some trigger event, such as failure to meet reporting requirements, or inability to redeem any or all of the seed investment, or hedge its investment in the fund at any time for any reason, etc. Upon the occurrence of a trigger event, the financial institution 320 may be entitled to submit a notice of redemption with potential termination fees that could apply. At least part of the financial institution's 320 investment may be redeemed due to the asset manager's 310 request or due to a percentage of a third party's equity ownership of the fund exceeding a certain threshold.

In certain embodiments, either the financial institution 320 or the asset manager 310 may have early termination rights due to breach or failure to satisfy any conditions. The rights/obligations available under early termination may vary according to the reason for termination. In certain embodiments, the mutual investment fund 330 fees and expenses charged to investors in the mutual investment fund 330 (including any combination, or all of, the management, performance or distribution fees) may be waived or rebated to the financial institution 320 in connection with it or its affiliate entity's seed investment (e.g., that of the offshore entity 340 making the equity investment in the mutual investment fund 330).

The financial institution 320 or any affiliate thereof may hedge against risks associated with its investment in the mutual investment fund 330 by entering into derivative or other hedging transactions such that it effectively has no market exposure to such an investment. For example, the financial institution 320 or an affiliate may act as principal instead of dealer in executing trade orders 316, wherein the financial institution 320 or an affiliate will use stock out of its own inventory to sell to the mutual investment fund 330 or buy stock for its inventory. In this manner the financial institution 320 has an equal and opposite position to each position of the mutual investment fund 330. If the financial institution 320 enters into a seeding investment agreement 300 with the mutual investment fund 330, it may choose to hedge the underlying on the agreement 300 with the investment in the mutual investment fund 330 or through an agreement with an affiliate, instead of with underlying securities. The combination of the investment into the mutual investment fund 330, and the trading with the mutual investment fund 330 in both cases as a combination mitigates the market risk in the mutual investment fund 330 for the financial institution 320. The financial institution 320 may charge the asset manager 310 fees for hedge positions in hard-to-borrow security investments made by the mutual investment fund 330. Computerized spreadsheets and other internal programs are used to monitor trading risk.

Figure 3:
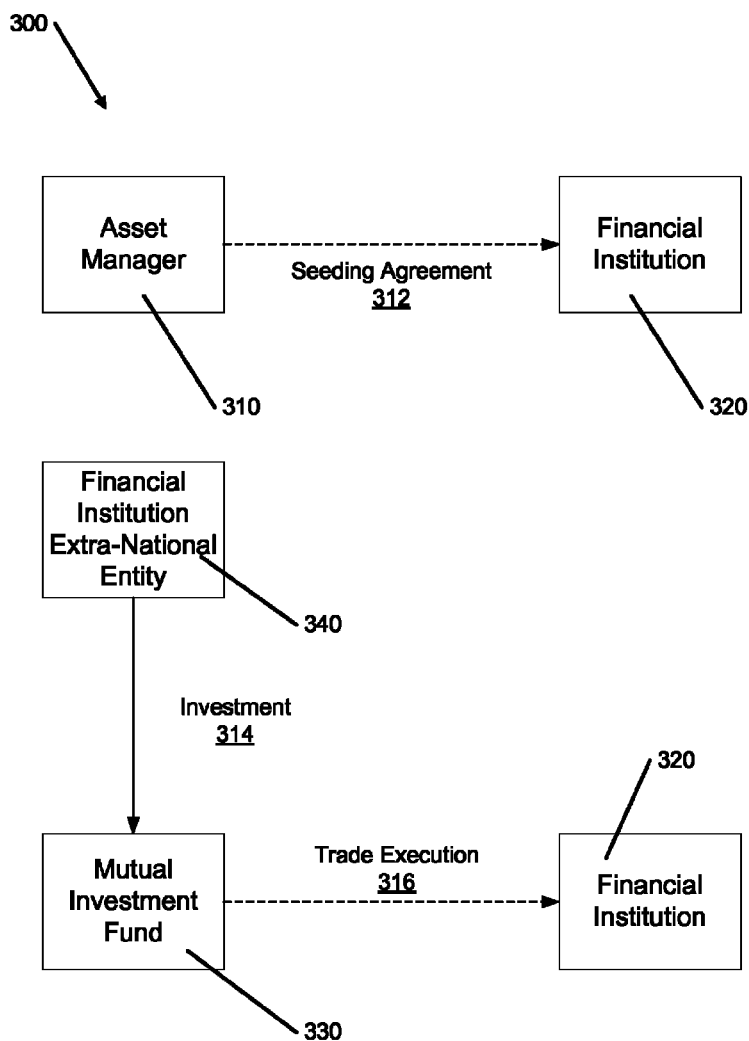
FIG. 3 is another illustrative block diagram of a structured seeding investment in accordance with the disclosure

Such an arrangement described as Seeding Structure II 300 would enable the asset manager 310 to take advantage of the benefits afforded by the mutual investment fund 330, by receiving seed capital invested in the mutual investment fund 330 in a manner that does not require the asset manager 310 to invest directly in the underlying fund. An exemplary transaction under this arrangement is depicted in FIG. 3 and summarized in the accompanying description provided. FIG. 3 and corresponding description is provided for the purposes of illustration and the present disclosure is not limited to them. Variations and modifications can be made to these, and some of the aspects discussed above are shown in FIG. 3 and description but other ones may not be, and vice versa.

As illustrated in FIG. 3, the following provides a summary for the transaction overview for the Seeding Structure II 300. The Seeding Structure II 300 may appeal to a counterparty such as an asset manager 310 that is unable to directly invest in the underlying. First, the provider, such as a financial institution 320, may enter into a seeding agreement 312 with the asset manager 310. The seeding agreement 312 may have the following characteristics: 1) financial institution 320 may make an equity investment 314 into the mutual investment fund 330 (e.g., 10% to 50% of the mutual investment fund 330—or less/more) via an offshore entity 340; 2) term: (e.g. 6-12 months—or shorter/longer term); 3) early termination rights may apply (note: breakage fees may apply); 4) financial institution 320 may act as an execution broker 316 for the mutual investment fund 330's trading, and when the financial institution 320 is not the execution broker, the financial institution 320 will act as the introductory broker and will generate trade instructions for the final execution broker; 5) ordinary fund fees (including management and performance fees) may be waived for financial institution offshore entity's 340 subscriptions.

The above arrangements are particularly beneficial to asset managers 310 at hedge funds, but can be favorable and offered to any other counterparty, including managers of other funds such as private equity funds or any investment funds, or for any other professional dealing in investment management.

Although the disclosure has been described with respect to certain embodiments and examples, as would be understood by one of ordinary skill in the art, variations and modifications exist which are within the scope of the present disclosure. As would also be understood by one of ordinary skill in the art, the features of the present disclosure preferably are subject to or take into account regulatory provisions, rules and regulations and/or opinions of governmental agencies.

The invention claimed is:

1. An apparatus comprising:
   at least one processor; and
   at least one memory storing computer executable instructions that, when executed, cause the apparatus at least to:
   provide structured finance products under one or more potential seeding structures, the one or more potential seeding structures including:
   a seeding investment agreement between an asset manager and a financial institution for establishing a mutual investment fund by the asset manager;
   a prepayment amount invested by the financial institution into the mutual investment fund; and
   a return on the seeding investment agreement based on a cash flow from the mutual investment fund, wherein the cash flow is a sum of a price differential and the prepayment amount and wherein the price differential is defined as $N \times [(Pt-Pt-1)/Pt-1]$ with N equal to the prepayment amount and added capital, Pt equal to a closing level of an index at a relevant valuation date, and Pt-1 equal the closing level of the index at a pre-determined valuation date; and
   monitor one or more a plurality of transactions or investments under the one or more potential seeding structures,
   generate reports for the one or more potential seeding structures, and track and analyze trading risks associated with the one or more potential seeding structures to monitor trading risk over time.

2. The apparatus of claim 1, wherein the cash flow is a predetermined percentage spread over a predetermined rate.

3. The apparatus of claim 1, wherein the cash flow is a product of the prepayment amount and a predetermined percentage.

4. The apparatus of claim 1, wherein the seeding investment agreement has a term of 6-12 months.

5. The apparatus of claim 1, wherein the seeding investment agreement includes a minimum collateral that includes the mutual investment fund.

6. The apparatus of claim 1, wherein the mutual investment fund is a fund governed by the United States' Investment Company Act of 1940.

7. The apparatus of claim 1, wherein the mutual investment fund is a fund governed by the European Union's Undertakings for Collective Investment in Transferable Securities ("UCITS").

8. A non-transitory computer-readable medium having stored thereon instructions that, when executed, direct a processer to:
provide structured finance products under one or more potential seeding structures;
monitor the transactions or investments under the one or more potential seeding structures;
generate reports for the one or more potential seeding structures; and
track and analyze trading risks associated with the one or more potential seeding structures to monitor the trading risks over time,
the one or more potential seeding structures including at least one of:
a first seeding structure having a seeding investment agreement between a financial institution and an asset manager for seeding a mutual investment fund managed by the asset manager, a purchase of a percentage of equity in the mutual investment fund via an offshore entity associated with the financial institution, and a trade execution of the mutual investment fund; and
a second seeding structure having a seeding investment agreement between an asset manager and a financial institution for establishing a mutual investment fund by the asset manager, a prepayment amount invested by the financial institution into the mutual investment fund, and a return on the seeding investment agreement based on a cash flow from the mutual investment fund, wherein the cash flow is a sum of a price differential and the prepayment amount and wherein the price differential is defined as $N \times [(Pt-Pt-1)/Pt-1]$ with N equal to the prepayment amount and added capital, Pt equal to a closing level of an index at a relevant valuation date, and Pt−1 equal the closing level of the index at a pre-determined valuation date.

9. The non-transitory computer-readable medium of claim 8, wherein the seeding investment agreement has a term of 6-12 months.

10. The non-transitory computer-readable medium of claim 8, wherein the mutual investment fund is a fund governed by the United States' Investment Company Act of 1940.

11. The non-transitory computer-readable medium of claim 8, wherein the mutual investment fund is a fund governed by the European Union's Undertakings for Collective Investment in Transferable Securities ("UCITS").

12. The non-transitory computer-readable medium of claim 8, further including: act as an execution broker for the mutual investment fund.

* * * * *